United States Patent
Tov et al.

(10) Patent No.: US 12,367,190 B1
(45) Date of Patent: Jul. 22, 2025

(54) SYSTEM, METHOD, AND COMPUTER PROGRAM FOR MINIMIZATION OF COMPUTE RESOURCES USED IN DATA PROCESSING OVER CASSANDRA TYPE No-SQL DATABASE

(71) Applicant: Amdocs Development Limited, Limassol (CY)

(72) Inventors: Atzmon Chen Tov, Kfar Saba (IL); Ortal Pinhas Ochana, Kfar Yona (IL); Pavel Yefim May, Rishon leZion (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 0 days.

(21) Appl. No.: 18/909,773

(22) Filed: Oct. 8, 2024

(51) Int. Cl.
*G06F 16/20* (2019.01)
*G06F 16/23* (2019.01)
*G06F 16/27* (2019.01)

(52) U.S. Cl.
CPC .......... *G06F 16/2386* (2019.01); *G06F 16/27* (2019.01); *G06F 16/278* (2019.01)

(58) Field of Classification Search
CPC ..... G06F 16/2386; G06F 16/27; G06F 16/278
See application file for complete search history.

(56) References Cited

U.S. PATENT DOCUMENTS

| | | | |
|---|---|---|---|
| 9,886,441 B2 | 2/2018 | Bhagat et al. | |
| 10,691,501 B1* | 6/2020 | Hussain | G06F 9/485 |
| 2016/0292171 A1 | 10/2016 | Bhagat et al. | |
| 2021/0004357 A1* | 1/2021 | Bagchi | G06F 16/217 |
| 2021/0342197 A1* | 11/2021 | Srinivasan | G06F 9/505 |

OTHER PUBLICATIONS

Wikipedia, "Online transaction processing," Wikipedia, 2024, 3 pages, retrieved from https://en.wikipedia.org/wiki/Online_transaction_processing.
Wikipedia, "Apache Cassandra," Wikipedia, 2024, 7 pages, retrieved from https://en.wikipedia.org/wiki/Apache_Cassandra.

\* cited by examiner

*Primary Examiner* — Diedra McQuitery
(74) *Attorney, Agent, or Firm* — Zilka-Kotab, P.C.

(57) ABSTRACT

As described herein, a system, method, and computer program are provided for providing shard-aware bulk requests for a Cassandra No-SQL database system having a plurality of distributed nodes with replication. A request to perform a database operation on the Cassandra No-SQL database system is received from an application. Token ranges of partition keys included with the request are determined. The request is grouped with a plurality of additional database operation requests to form a bulk request, where requests are grouped by a target node in the Cassandra No-SQL database system such that the target node holds token ranges for all requests included in the bulk request. The bulk request is communicated to the target node of the Cassandra No-SQL database system for processing of the requests included in the bulk request.

20 Claims, 6 Drawing Sheets

SYSTEM, METHOD, AND COMPUTER PROGRAM FOR MINIMIZATION OF COMPUTE RESOURCES USED IN DATA PROCESSING OVER CASSANDRA TYPE No-SQL DATABASE

FIELD OF THE INVENTION

The present invention relates to database processes.

BACKGROUND

Apache Cassandra is a free and open-source, distributed, wide-column store, No-SQL database management system designed to handle large amounts of data across many commodity servers thereby providing high availability with no single point of failure. In streaming data pipeline and online transaction processing (OLTP) environments that involve a Cassandra type database system, there is high number of roundtrips between the application and the Cassandra No-SQL database and between Cassandra No-SQL database nodes, and as a result these environments experience congestion which in turn causes delays in processing. In Cassandra, token ranges are numerical intervals assigned to nodes, determining which data each node is responsible for based on hashed partition keys. Mapping a partition key to a token range is done with invertible function.

There is thus a need for addressing these and/or other issues associated with the prior art. For example, there is a need to minimize use of compute resources in data processing over a Cassandra No-SQL database system.

SUMMARY

As described herein, a system, method, and computer program are provided for providing shard-aware bulk requests for a Cassandra No-SQL database system having a plurality of distributed nodes with replication. A request to perform a database operation on the Cassandra No-SQL database system is received from an application. Token ranges of partition keys included with the request are determined. The request is grouped with a plurality of additional database operation requests to form a bulk request, where requests are grouped by a target node in the Cassandra No-SQL database system such that the target node holds token ranges for all requests included in the bulk request. The bulk request is communicated to the target node of the Cassandra No-SQL database system for processing of the requests included in the bulk request.

DETAILED DESCRIPTION

Figure 1:
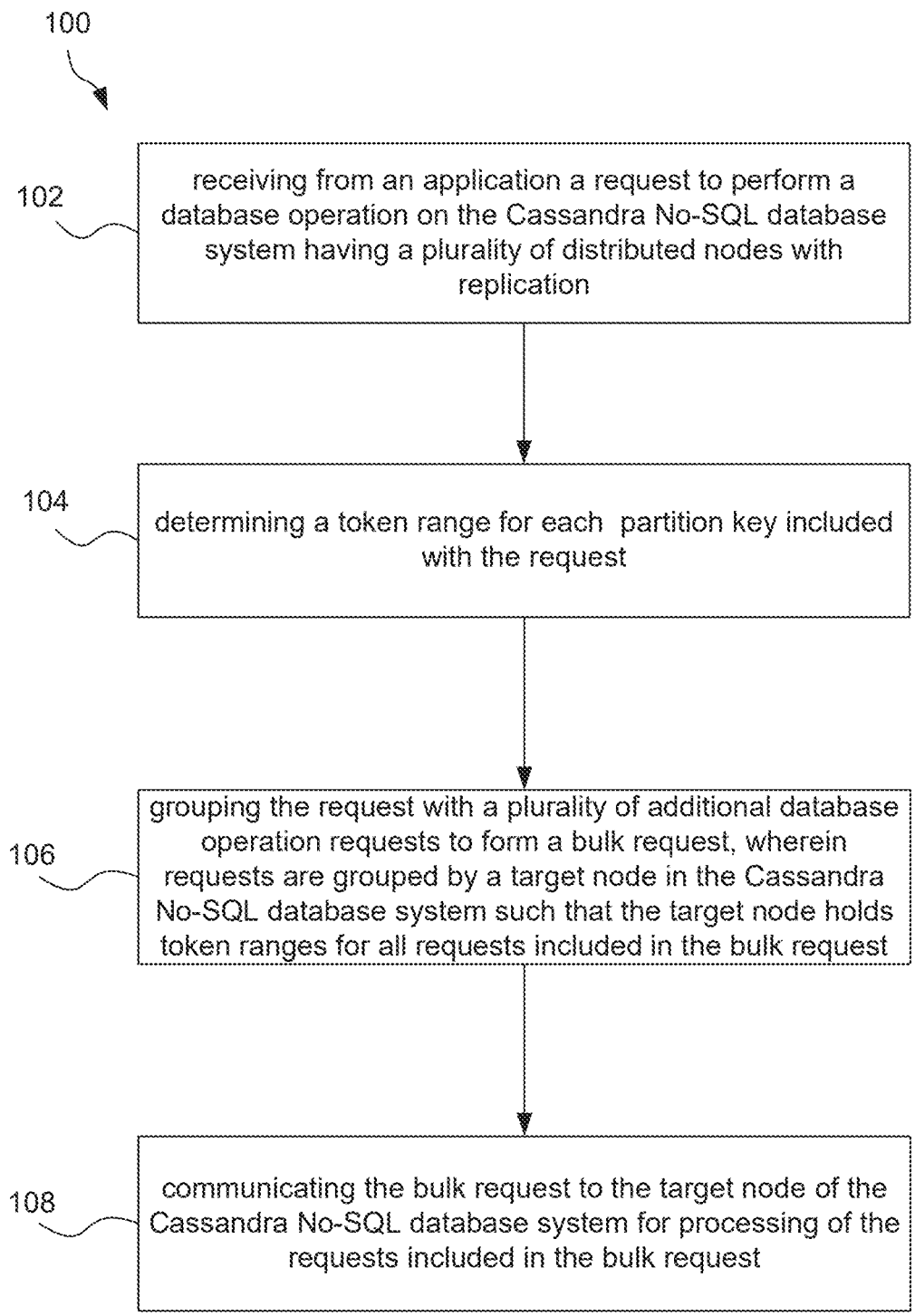
FIG. 1 illustrates a method for providing shard-aware bulk requests for a Cassandra No-SQL database system, in accordance with one embodiment.

FIG. 1 illustrates a method 100 for providing shard-aware bulk requests for a Cassandra No-SQL database system, in accordance with one embodiment. The method may be carried out by a computer system, such as that described below with respect to FIGS. 5 and/or 6. In an embodiment, the computer system may interface the Cassandra No-SQL database system and applications that issue database operation requests to the Cassandra No-SQL database system. Accordingly, the method 100 may be performed by an intermediary software component or system that generates shard-aware bulk requests from requests issued by the applications and that communicates such requests to the Cassandra No-SQL database system.

With respect to the present description, the Cassandra No-SQL database system is a distributed database system that has a plurality of distributed nodes with replication. Each node represents a single instance of a Cassandra database. The nodes communicate with one another through a protocol, which is a process of computer peer-to-peer communication. In an embodiment, multiple nodes can be organized logically into a cluster.

The data in the Cassandra No-SQL database system is automatically distributed by using partition keys. Partition keys are mapped to numeric tokens with an invertible function. Each node owns a particular set of token-ranges, and Cassandra distributes data based on the ranges of these token ranges assignment across the cluster. In particular, when data is inserted into a cluster, a partition key received with the data is hashed to generate a token value which is then used to determine (from the per node token ranges) which node in the cluster is assigned a token range that includes the token value and thus which node will get the data. The node that owns the data for that range is called a replica node. In the Cassandra No-SQL database system, any node can receive a database operation request. This node can act as a coordinator to forward the request to the node that owns the data that is subject to the database operation request.

As mentioned, the Cassandra No-SQL database system includes replication. One piece of data can be replicated to multiple (replica) nodes, ensuring reliability and fault tolerance. Cassandra supports the notion of a replication factor (RF), which describes how many copies of a piece of data should exist in the database. For a RF>1, each node becomes responsible for a secondary range of tokens, in addition to its primary range.

Returning to the method 100, in operation 102, a request to perform a database operation on the Cassandra No-SQL database system is received from an application. In an embodiment, the database operation is a read operation. In an embodiment, the database operation is a write operation. In any case, the request includes a partition key for the data to be read/written.

Figure 2:
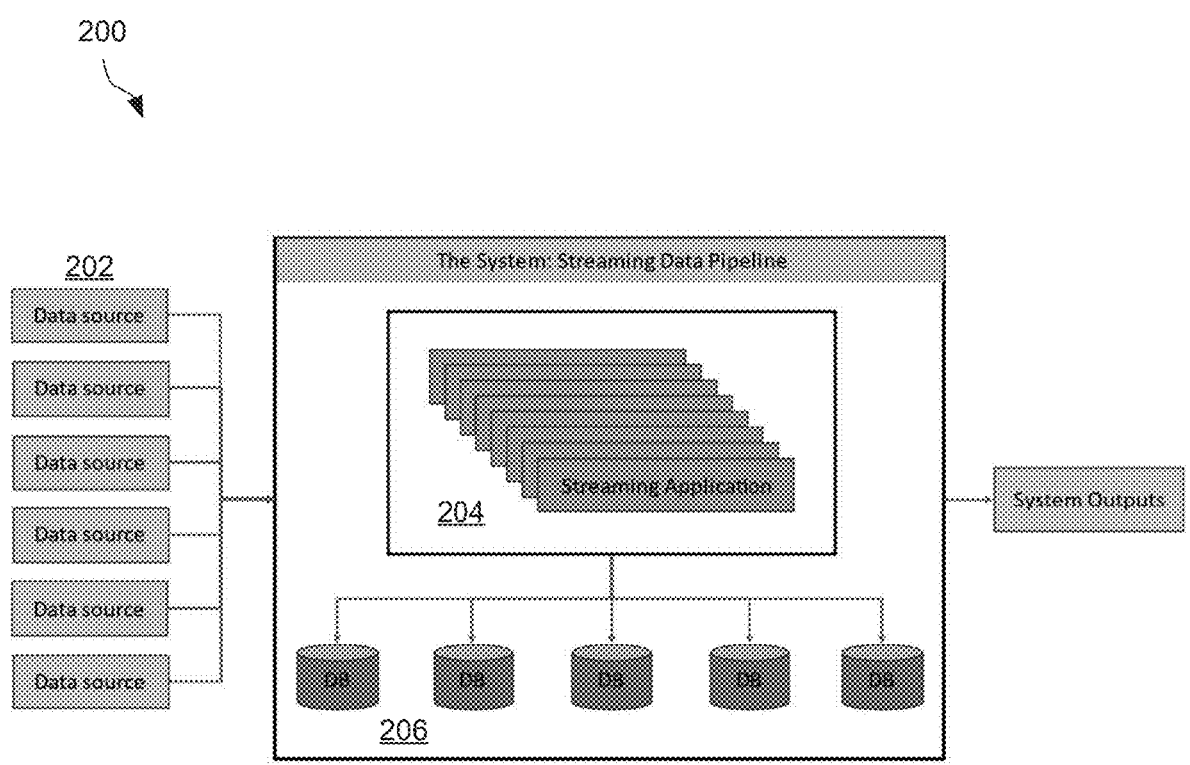
FIG. 2 illustrates a streaming data pipeline system that uses a Cassandra No-SQL database sub-system, in accordance with one embodiment.

In an embodiment, the application that issued the request may be one of a plurality of applications that issue database operation requests to the Cassandra No-SQL database system. In an embodiment, the applications and the Cassandra No-SQL database system form a data streaming pipeline-based system (e.g. as shown in FIG. 2). In an embodiment, the data streaming pipeline-based system receives data from one or more source streams of data, processes the data using the shard-aware bulk requests in accordance the method 100, and generates a system output as a result of the processing of the shard-aware bulk requests.

Figure 3:
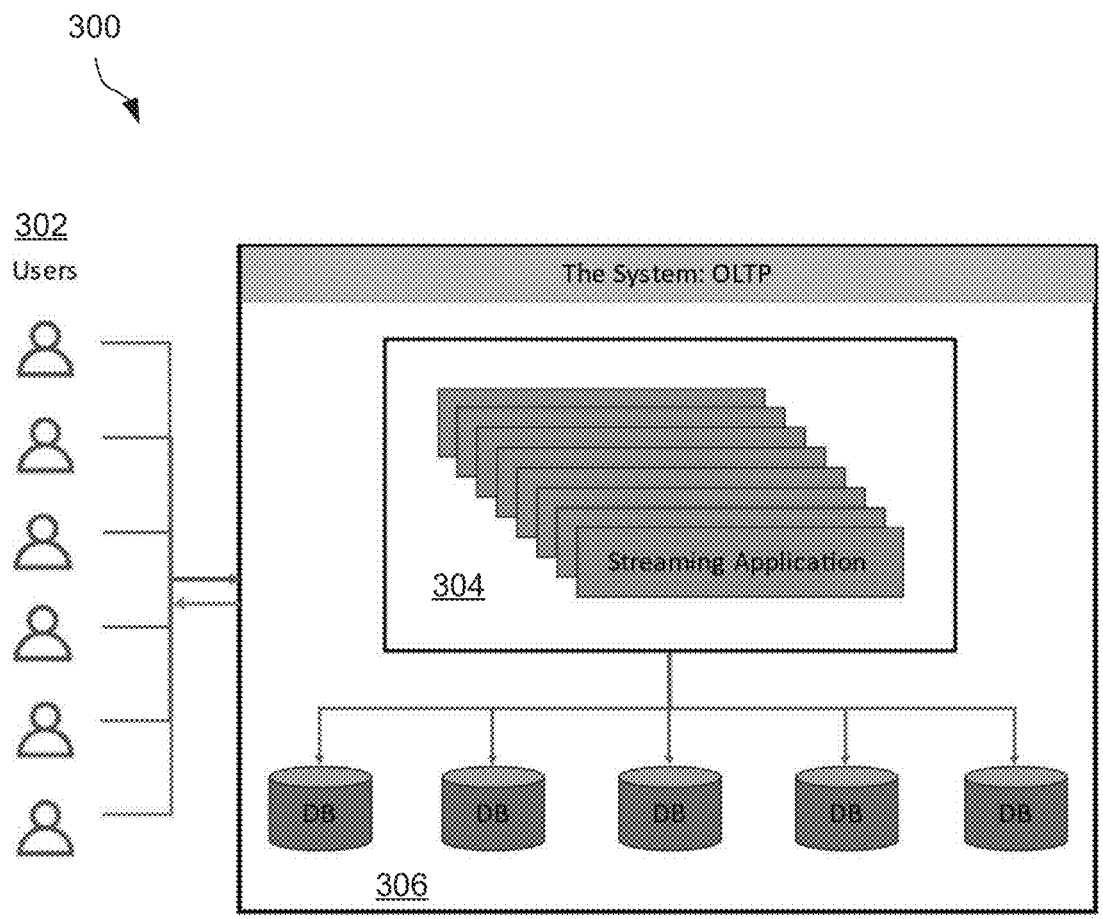
FIG. 3 illustrates an OLTP system that uses a Cassandra No-SQL database sub-system, in accordance with one embodiment.

In another embodiment, the applications and the Cassandra No-SQL database system form an online transaction processing (OLTP)-based system (e.g. as shown in FIG. 3). In this embodiment, the OLTP-based system receives user requests from one or more users, processes the user requests using the shard-aware bulk requests in accordance the method 100, and generates an output back to the one or more users as a result of the processing of the shard-aware bulk requests.

In operation 104, a token range for each partition key included with the request is determined. The partition key identifies the partition storing the data that is the subject of the database operation. In an embodiment, the partition key is included in a primary key that is included with the request. In an embodiment, the primary key also includes a cluster key identifying a cluster storing the data that is the subject of the database operation.

In operation 106, the request is grouped with a plurality of additional database operation requests to form a bulk request. In an embodiment, a single statement may be generated to include all of the database operation requests being grouped together. For example, the single statement (representing the bulk request) may be a single select statement having parameters for all of the requested partition keys being grouped together.

With respect to the present description, requests are grouped by a target node in the Cassandra No-SQL database system such that the target node holds token ranges for all requests included in the bulk request. In other words, database operation requests are grouped when they all refer to partitions held by a same node. In an embodiment, the bulk request may be generated after a defined time period during which database operation requests are received.

In an embodiment, the target node is a replica node. In an embodiment, the target node is included in a cluster of nodes of the Cassandra No-SQL database.

In operation 108, the bulk request is communicated to the target node of the Cassandra No-SQL database system for processing of the requests included in the bulk request. Thus, upon receipt of the bulk request, the target node may process the requests included in the bulk request. In an embodiment, the bulk request may be executed in a separate thread from other bulk requests which may be executed by other nodes.

To this end, the method 100 provides shard-aware bulk requests for a Cassandra No-SQL database system, which may in turn enable near real-time data processing. Further, using shard-aware bulk requests in the manner described can reduce to a minimum the network roundtrips for requests between the application and the Cassandra No-SQL database system as well as between nodes of the Cassandra No-SQL database system.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

FIG. 2 illustrates a streaming data pipeline system 200 that uses a Cassandra No-SQL database sub-system, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, the streaming data pipeline system 200 receives data from one or more source streams of data 202. Based on the received data, the applications 204 of the streaming data pipeline system 200 issue database operation (e.g. write) requests to the Cassandra type No-SQL database sub-system 206 which is used for persistent storage of the data.

The streaming data pipeline system 200 provides shard-aware bulk requests for the Cassandra No-SQL database sub-system 206. In particular, the applications 204 groups requests by target node to form a bulk request. The applications 204 then communicate (i.e. issues, transmits, etc.) the bulk request to the target node of the Cassandra No-SQL database sub-system 206 for processing of the requests included in the bulk request.

FIG. 3 illustrates an OLTP system 300 that uses a Cassandra No-SQL database sub-system, in accordance with one embodiment. As an option, the system 300 may be implemented in the context of the details of the previous figure and/or any subsequent figure(s). Of course, however, the system 300 may be implemented in the context of any desired environment. Further, the aforementioned definitions may equally apply to the description below.

As shown, the OLTP system 300 receives data or database operation requests from one or more users 302. Based on the received data or requests, the applications 304 of the OLTP system 300 issue database operation (e.g. write or read) requests to the Cassandra type No-SQL database sub-system 306 which is used for persistent storage of the data.

The OLTP system 300 provides shard-aware bulk requests for the Cassandra No-SQL database sub-system 306. In particular, the applications 304 group requests by target node to form a bulk request. The applications 304 then communicate (i.e. issues, transmits, etc.) the bulk request to the target node of the Cassandra No-SQL database sub-system 306 for processing of the requests included in the bulk request.

Figure 4:
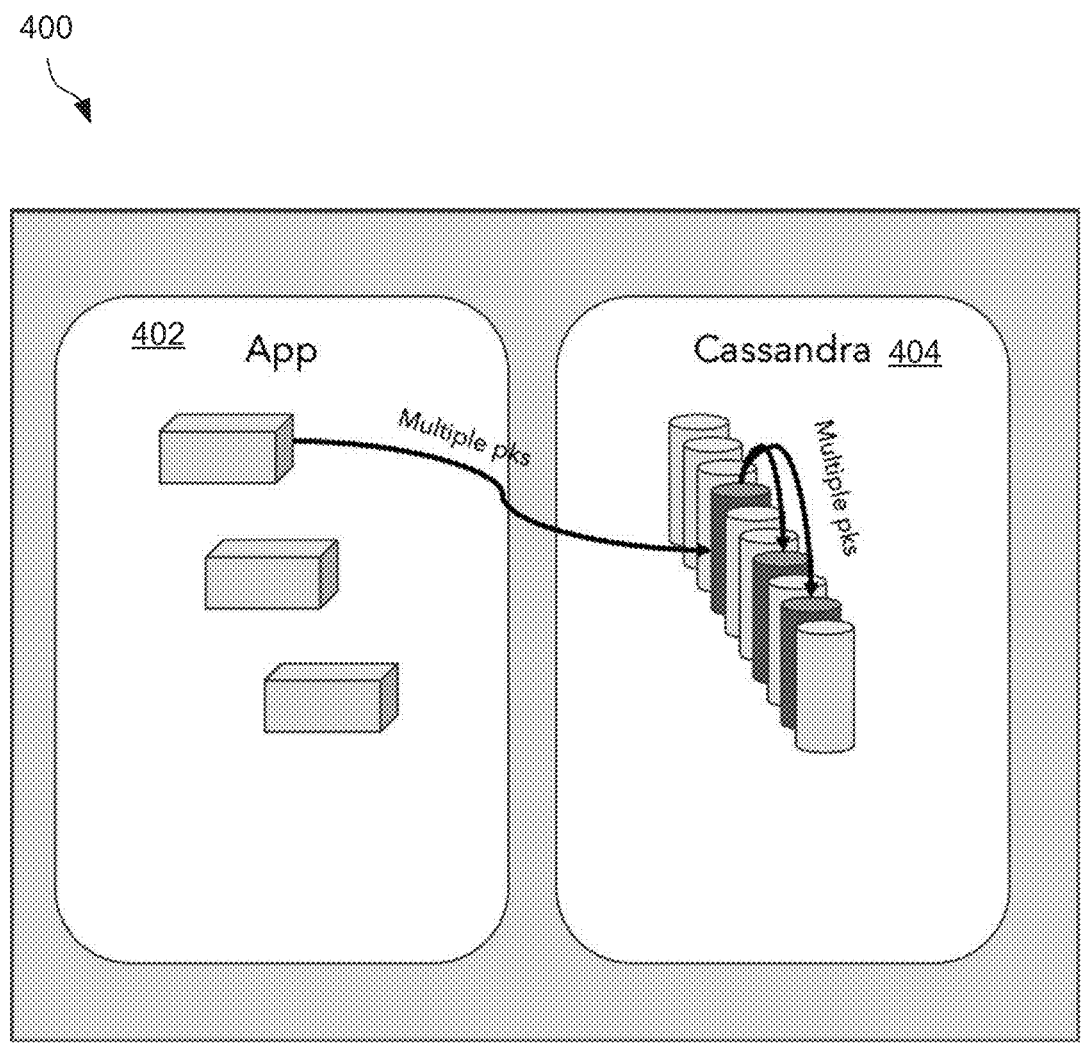
FIG. 4 illustrates a flow diagram for a system that minimizes use of compute resources in data processing over a Cassandra No-SQL database sub-system, in accordance with one embodiment.

FIG. 4 illustrates a flow diagram for a system 400 that minimizes use of compute resources in data processing over a Cassandra No-SQL database sub-system, in accordance with one embodiment. As an option, the system 400 may be implemented in the context of the details of the previous figure and/or any subsequent figure(s). Of course, however, the system 400 may be implemented in the context of any desired environment. Further, the aforementioned definitions may equally apply to the description below.

As shown, the system 400 includes an application 402 (e.g. application 204 or 304) which receives data or database operation requests from one or more users (e.g. users 302) or data sources (e.g. data sources 202). Based on the received data or requests, the application 402 generates shard-aware bulk requests which group individual requests by target node of the Cassandra No-SQL database sub-system 404. The application 402 then communicates (i.e. issues, transmits, etc.) the bulk request to the target node of the Cassandra No-SQL database sub-system 404 for processing of the requests included in the bulk request.

In an exemplary implementation, the shard-aware bulk processing reduces to a minimum the number of roundtrips in the cluster. Read operations are bulked by querying many partition keys in a single query, for example as shown in Table 1.

TABLE 1

| select . . . where partition_key in ('pk1', 'pk2' . . . ) |
| --- |

Write operations are bulked with BATCHes.

The system 400 groups partition-keys in bulk by the node that owns the token range of the partition key. This grouping may be done using the local Cassandra/Scylla driver without roundtrip to the Cassandra No-SQL database sub-system 404. When a group is larger than the bulk size limit, the execution may be done by paging through the list.

By using the shard-aware bulk processing described above, congestion on the cluster may be reduced when processing from multiple clients (multiple pod instances or application threads). This is because with shard-aware bulk processing, each statement may involve exactly the RF.

Figure 5:
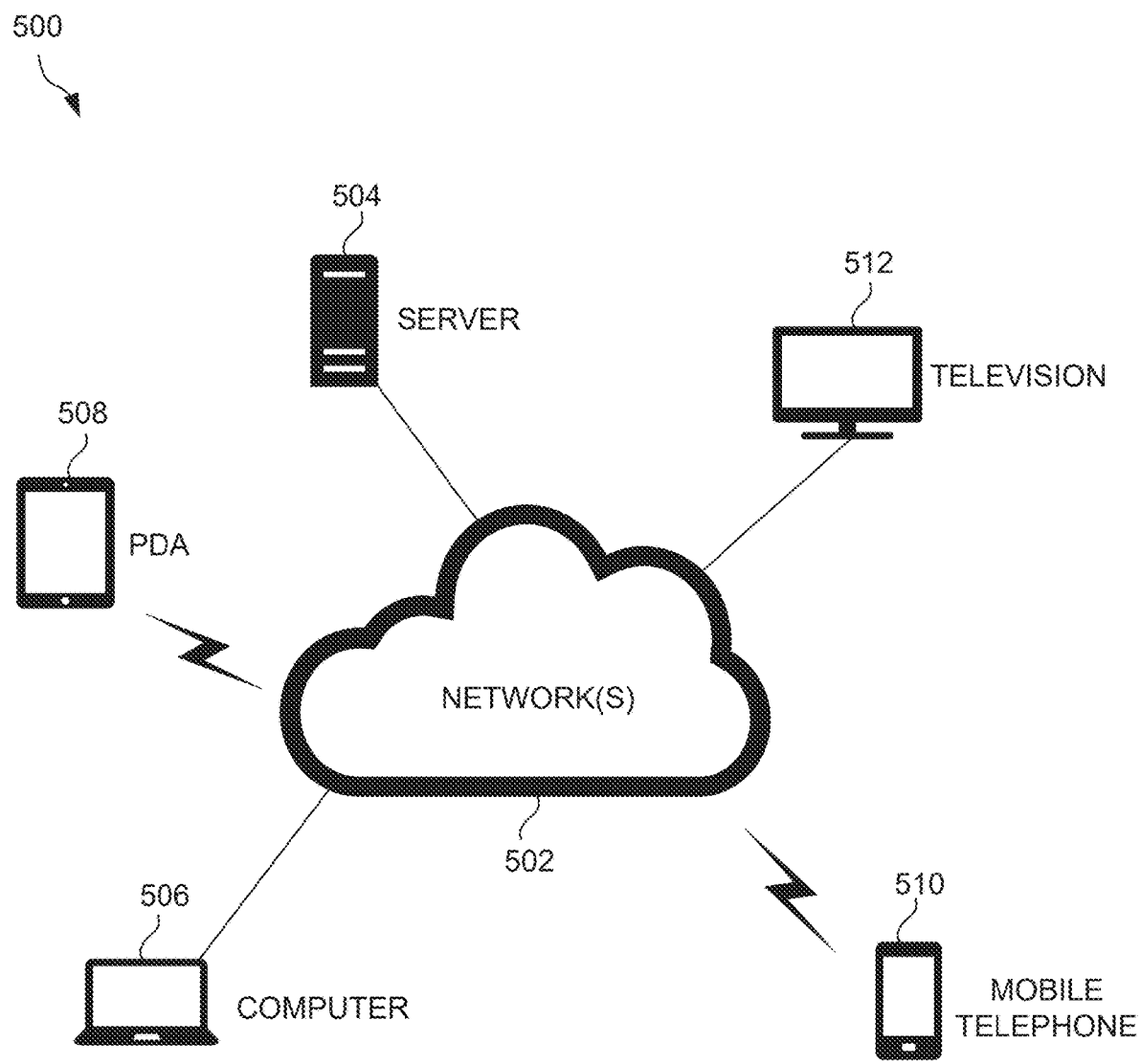
FIG. 5 illustrates a network architecture, in accordance with one possible embodiment.

The system 400 operates to:
1. work in bulks of records at the application level
2. divide each bulk into target Cassandra type No-SQL database node specific sub-bulks
3. construct bulk reads and bulk writes using the Cassandra type No-SQL database bulk commands
4. Multi-thread process all sub-bulks concurrently directing each request to the precalculated target Cassandra type No-SQL database node The system 400 provides:
1. productivity increase per compute core in the application
2. productivity increase per compute core in the Cassandra type No-SQL database
3. ability to defer to reduced mode of processing under high load to cope with spikes in traffic, without the need to add compute resources
4. ability to provide tiers of latency thresholds that operate on the same Cassandra type No-SQL database but provide different trade-offs between cost and data-latency FIG. 5 illustrates a network architecture 500, in accordance with one possible embodiment. As shown, at least one network 502 is provided. In the context of the present network architecture 500, the network 502 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 502 may be provided.

Coupled to the network 502 is a plurality of devices. For example, a server computer 504 and an end user computer 506 may be coupled to the network 502 for communication purposes. Such end user computer 506 may include a desktop computer, lap-top computer, and/or any other type of logic. Still yet, various other devices may be coupled to the network 502 including a personal digital assistant (PDA) device 508, a mobile phone device 510, a television 512, etc.

Figure 6:
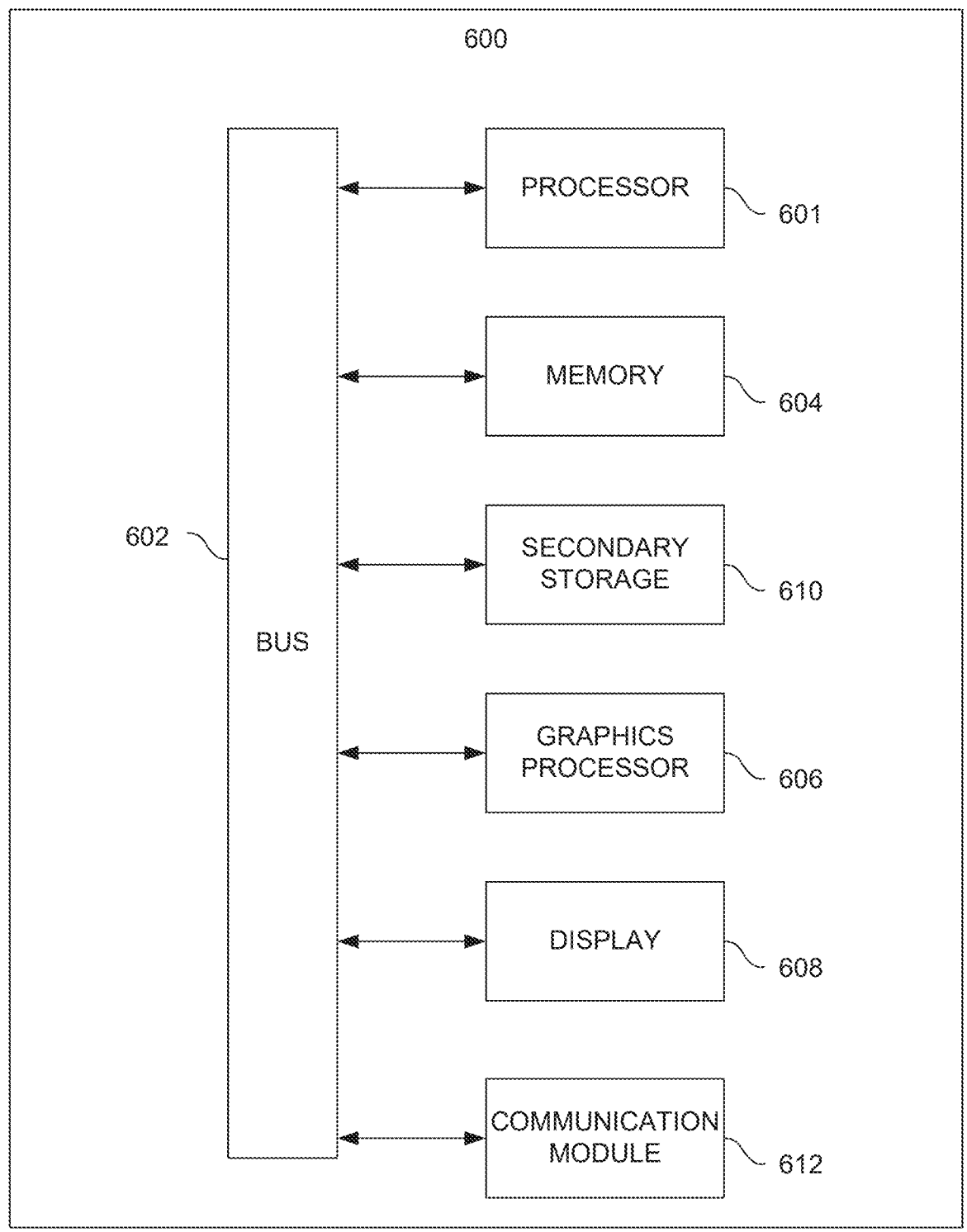
FIG. 6 illustrates an exemplary system, in accordance with one embodiment.

FIG. 6 illustrates an exemplary system 600, in accordance with one embodiment. As an option, the system 600 may be implemented in the context of any of the devices of the network architecture 500 of FIG. 5. Of course, the system 600 may be implemented in any desired environment.

As shown, a system 600 is provided including at least one central processor 601 which is connected to a communication bus 602. The system 600 also includes main memory 604 [e.g. random access memory (RAM), etc.]. The system 600 also includes a graphics processor 606 and a display 608.

The system 600 may also include a secondary storage 610. The secondary storage 610 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 604, the secondary storage 610, and/or any other memory, for that matter. Such computer programs, when executed, enable the system 600 to perform various functions (as set forth above, for example). Memory 604, storage 610 and/or any other storage are possible examples of non-transitory computer-readable media.

The system 600 may also include one or more communication modules 612. The communication module 612 may be operable to facilitate communication between the system 600 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer-readable media storing computer instructions which when executed by one or more processors of a device cause the device to provide shard-aware bulk requests for a Cassandra No-SQL database system having a plurality of distributed nodes with replication by:
   receiving from an application a request to perform a database operation on the Cassandra No-SQL database system having a plurality of distributed nodes with replication;
   determining a token range for each partition key included with the request;
   grouping the request with a plurality of additional database operation requests to form a bulk request, wherein requests are grouped by a target node in the Cassandra No-SQL database system such that the target node holds token ranges for all requests included in the bulk request; and
   communicating the bulk request to the target node of the Cassandra No-SQL database system for processing of the requests included in the bulk request.

2. The non-transitory computer-readable media of claim 1, wherein the application is one of a plurality of applications that issue database operation requests to the Cassandra No-SQL database system.

3. The non-transitory computer-readable media of claim 2, wherein the applications and the Cassandra No-SQL database system form a data streaming pipeline-based system.

4. The non-transitory computer-readable media of claim 3, wherein the data streaming pipeline-based system receives data from one or more source streams of data, processes the data using the shard-aware bulk requests, and generates a system output as a result of the processing of the shard-aware bulk requests.

5. The non-transitory computer-readable media of claim 2, wherein the applications and the Cassandra No-SQL database system form an online transaction processing-based system.

6. The non-transitory computer-readable media of claim 5, wherein the online transaction processing-based system receives user requests from one or more users, processes the user requests using the shard-aware bulk requests, and generates an output back to the one or more users as a result of the processing of the shard-aware bulk requests.

7. The non-transitory computer-readable media of claim 1, wherein the partition key is included in a primary key included with the request.

8. The non-transitory computer-readable media of claim 1, wherein the bulk request is executed in a separate thread from other bulk requests.

9. The non-transitory computer-readable media of claim 1, wherein the target node is a replica node.

10. The non-transitory computer-readable media of claim 1, wherein the target node is included in a cluster of nodes of the Cassandra No-SQL database.

11. A method, comprising:
at a computer system providing shard-aware bulk requests for a Cassandra No-SQL database system having a plurality of distributed nodes with replication by:
receiving from an application a request to perform a database operation on the Cassandra No-SQL database system having a plurality of distributed nodes with replication;
determining a token range for each partition key included with the request;
grouping the request with a plurality of additional database operation requests to form a bulk request, wherein requests are grouped by a target node in the Cassandra No-SQL database system such that the target node holds token ranges for all requests included in the bulk request; and
communicating the bulk request to the target node of the Cassandra No-SQL database system for processing of the requests included in the bulk request.

12. The method of claim 11, wherein the application is one of a plurality of applications that issue database operation requests to the Cassandra No-SQL database system.

13. The method of claim 12, wherein the applications and the Cassandra No-SQL database system form a data streaming pipeline-based system.

14. The method of claim 13, wherein the data streaming pipeline-based system receives data from one or more source streams of data, processes the data using the shard-aware bulk requests, and generates a system output as a result of the processing of the shard-aware bulk requests.

15. The method of claim 12, wherein the applications and the Cassandra No-SQL database system form an online transaction processing-based system.

16. The method of claim 15, wherein the online transaction processing-based system receives user requests from one or more users, processes the user requests using the shard-aware bulk requests, and generates an output back to the one or more users as a result of the processing of the shard-aware bulk requests.

17. The method of claim 11, wherein the partition key is included in a primary key included with the request.

18. The method of claim 11, wherein the bulk request is executed in a separate thread from other bulk requests.

19. The method of claim 11, wherein the target node is a replica node included in a cluster of nodes of the Cassandra No-SQL database.

20. A system, comprising:
a non-transitory memory storing instructions; and
one or more processors in communication with the non-transitory memory that execute the instructions to provide shard-aware bulk requests for a Cassandra No-SQL database system having a plurality of distributed nodes with replication by:
receiving from an application a request to perform a database operation on the Cassandra No-SQL database system;
determining a token range for each partition key included with the request;
grouping the request with a plurality of additional database operation requests to form a bulk request, wherein requests are grouped by a target node in the Cassandra No-SQL database system such that the target node holds token ranges for all requests included in the bulk request; and
communicating the bulk request to the target node of the Cassandra No-SQL database system for processing of the requests included in the bulk request.

* * * * *